(12) United States Patent
Cole

(10) Patent No.: US 8,841,617 B2
(45) Date of Patent: Sep. 23, 2014

(54) FLAME DETECTORS AND METHODS OF DETECTING FLAMES

(75) Inventor: Barrett E. Cole, Bloomington, MN (US)

(73) Assignee: Honeywell International Inc., Morristown, NJ (US)

(*) Notice: Subject to any disclaimer, the term of this patent is extended or adjusted under 35 U.S.C. 154(b) by 182 days.

(21) Appl. No.: 13/486,118

(22) Filed: Jun. 1, 2012

(65) Prior Publication Data

US 2013/0009062 A1    Jan. 10, 2013

Related U.S. Application Data

(60) Provisional application No. 61/504,645, filed on Jul. 5, 2011.

(51) Int. Cl.
*F23N 5/08* (2006.01)
*G01J 5/08* (2006.01)
*G08B 17/12* (2006.01)
*G01J 5/00* (2006.01)
*G01J 5/20* (2006.01)

(52) U.S. Cl.
CPC ............ *G08B 17/12* (2013.01); *G01J 5/0834* (2013.01); *F23N 2029/00* (2013.01); *F23N 2029/04* (2013.01); *G01J 5/0014* (2013.01); *G01J 5/20* (2013.01); *F23N 5/082* (2013.01); *G01J 5/0862* (2013.01); *G01J 5/0806* (2013.01)
USPC ................................. 250/339.15; 250/339.14

(58) Field of Classification Search
USPC ............ 250/330, 332, 338.4, 339.01, 339.02, 250/339.14, 339.15
See application file for complete search history.

(56) References Cited

U.S. PATENT DOCUMENTS

| 2009/0014657 | A1 | 1/2009 | Cole | |
|---|---|---|---|---|
| 2009/0262978 | A1* | 10/2009 | Zavagli et al. | 382/103 |
| 2011/0170798 | A1* | 7/2011 | Tidhar | 382/276 |
| 2011/0297828 | A1* | 12/2011 | Weisbach et al. | 250/330 |

FOREIGN PATENT DOCUMENTS

| GB | 2365120 | 2/2002 |
|---|---|---|
| JP | 11-295142 | 10/1999 |

OTHER PUBLICATIONS

A Search Report from related Great Britian Application No. GB1211259.5, dated Oct. 8, 2012, 7 pgs.

* cited by examiner

*Primary Examiner* — Mark R Gaworecki
(74) *Attorney, Agent, or Firm* — Brooks, Cameron & Huebsch, PLLC

(57) ABSTRACT

Flame detectors and methods of detecting flames are described herein. One device includes an optical element configured to process mid wave infra-red light and long wave infra-red light emitted from an area, and a bolometer configured to detect a flame in the area based on the mid wave infra-red light and long wave infra-red light processed by the optical element.

20 Claims, 2 Drawing Sheets

FLAME DETECTORS AND METHODS OF DETECTING FLAMES

CROSS-REFERENCE TO RELATED APPLICATIONS

This application is a non-provisional of U.S. Provisional Application Ser. No. 61/504,645, filed Jul. 5, 2011, the entire specification of which is incorporated herein by reference.

TECHNICAL FIELD

The present disclosure relates to flame detectors and methods of detecting flames.

BACKGROUND

Flame detectors can be used to detect the presence of flames (e.g., fires) in a number of different environments, such as, for instance, oil platforms. For example, a flame detector can detect the presence of a flame by detecting the light (e.g., radiation) emitted by the flame.

Because the main emission of a flame is mid wave infra-red (MWIR) light (e.g., light having a wavelength of 3.0 to 5.0 micrometers), previous flame detectors may be configured to detect and/or process only MWIR light. That is, previous flame detectors may not be able to detect and/or process light outside of the MWIR range.

Detecting and processing only MWIR light, however, can decrease the effectiveness of a flame detector. For example, previous flame detectors that can detect and/or process only MWIR light may have a high false alarm rate (e.g., such previous flame detectors may frequently indicate that a flame has been detected in circumstances in which no flame is actually present).

DETAILED DESCRIPTION

Figure 1:
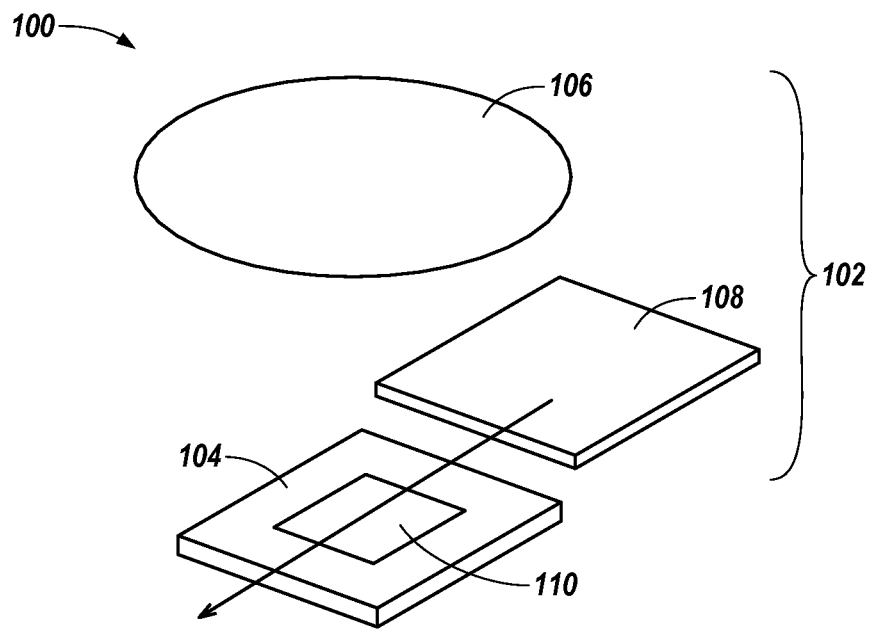
FIG. 1 illustrates an exploded view of a portion of a flame detector in accordance with one or more embodiments of the present disclosure.

Flame detectors and methods of detecting flames are described herein. For example, one or more embodiments include an optical element configured to process mid wave infra-red light and long wave infra-red light emitted from an area, and a bolometer configured to detect a flame in the area based on the mid wave infra-red light and long wave infra-red light processed by the optical element.

In addition to detecting and/or processing mid wave infra-red (MWIR) light (e.g., light having a wavelength of 3.0 to 5.0 micrometers), flame detectors in accordance with one or more embodiments of the present disclosure can detect and/or process light outside of the MWIR range. For example, flame detectors in accordance with one or more embodiments of the present disclosure can detect and/or process long wave infra-red (LWIR) light (e.g., light having a wavelength of 8.0 to 12.0 micrometers). Accordingly, flame detectors in accordance with one or more embodiments of the present disclosure can have increased effectiveness as compared to previous flame detectors. For example, flame detectors in accordance with one or more embodiments of the present disclosure may have a lower false alarm rate than previous flame detectors.

For instance, because the main emission of other objects in an area in addition to a flame (e.g., objects at ambient temperature, background objects in the area, and/or people in the area) may be LWIR light, flame detectors in accordance with one or more embodiments of the present disclosure can detect the presence of such objects in the area in addition to detecting the presence of the flame. Accordingly, flame detectors in accordance with one or more embodiments of the present disclosure can provide information on (e.g., identify) the location (e.g., source) of the flame in the area and/or a view of the area (e.g., the scene) in which the flame is burning.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a" or "a number of" something can refer to one or more such things. For example, "a number of optical elements" can refer to one or more optical elements.

FIG. 1 illustrates an exploded view of a portion of a flame detector 100 in accordance with one or more embodiments of the present disclosure. As shown in FIG. 1, flame detector 100 can include an optical element 102 and a bolometer 104.

Optical element 102 can include, for example, a lens 106 and an optical filter 108, as shown in the embodiment illustrated in FIG. 1. However, embodiments of the present disclosure are not so limited. For example, in some embodiments, optical element 102 may not include an optical filter. For instance, optical element 102 may only include a lens (e.g., lens 106) in some embodiments. As an additional example, optical element 102 can include a shutter in place of optical filter 108 in some embodiments.

Lens 106 can be, for example, a dual mid wave infra-red (MWIR) and long wave infra-red (LWIR) lens (e.g., a lens through which both MWIR light and LWIR light can pass). Additionally and/or alternatively, lens 106 can be, for example, a chalcogenide and/or silicon lens (e.g., lens 106 can include a chalcogenide and/or silicon material).

Lens 106 can have a diameter of, for example, 5 millimeters. However, embodiments of the present disclosure are not limited to a particular diameter for lens 106.

Optical filter 108 can be, for example, a sapphire and/or aluminum oxynitride (AlON) filter, and/or can include silicon dioxide ($SiO_2$) and/or cadmium sulfide (CdS). In some embodiments, optical filter 108 can have a fixed intensity ratio and/or a fixed infrared emission line.

In some embodiments, optical filter 108 can be a fixed (e.g., unmovable) filter positioned above bolometer 104 (e.g., between bolometer 104 and lens 106). In some embodiments optical filter 108 can be a movable filter. For instance, optical filter 108 can be moved from a position not between bolometer 104 and lens 106 (e.g., from the position illustrated in FIG. 1) to a position between bolometer 104 and lens 106.

In the embodiment illustrated in FIG. 1, optical element 102 includes a single optical filter (e.g., optical filter 108). However, embodiments of the present disclosure are not so limited. For example, in some embodiments, optical element 102 can include multiple (e.g., two) optical filters.

Although not shown in FIG. 1 for clarity and so as not to obscure embodiments of the present disclosure, in some embodiments optical element 102 can include a wide band reflector adjacent (e.g., on and/or attached to) a first side of optical filter 108, and a wide band transmitter adjacent a second (e.g., opposite) side of optical filter 108.

In the embodiment illustrated in FIG. 1, lens 106 and optical filter 108 are separate (e.g., not attached). However, embodiments of the present disclosure are not so limited. For example, in some embodiments, optical filter 108 can be attached to (e.g., applied to the face of and/or superimposed on) lens 106.

Bolometer 104 can include, for example, an array 110 of pixels, as shown in FIG. 1. In the embodiment illustrated in FIG. 1, bolometer 104 includes a single array (e.g., array 110) of pixels. However, embodiments of the present disclosure are not so limited. For example, in some embodiments, bolometer 104 can include multiple (e.g., separate) arrays of pixels.

In some embodiments, bolometer 104 can include a number of different materials (e.g., layers) not shown in FIG. 1 for clarity and so as not to obscure embodiments of the present disclosure. For example, in some embodiments, bolometer 104 can include a reflector, a vacuum gap, an absorber, a silicon nitride ($Si_3N_4$) material, a vanadium oxide ($VO_x$) material, and an additional $Si_3N_4$ material. The reflector can have a thickness of, for example, 100 nanometers (nm). The vacuum gap can have a thickness of, for example, 400 nm or 2800 nm. The absorber can have a sheet resistance of, for example, 90 Ohms per square ($\Omega$/sq). The $Si_3N_4$ materials can each have a thickness of, for example, 200 nm. The $VO_x$ material can have a thickness of, for example, 10 K/sq. In contrast, the thickness of the vacuum gap of previous bolometers may be, for example, 1800 nm, the thickness of the $Si_3N_4$ materials of previous bolometers may be, for example, 300 nm, and previous bolometers may not include an absorber.

Optical element 102 (e.g., lens 106 and/or filter 108) can process (e.g., capture) MWIR light (e.g., light having a wavelength of 3.0 to 5.0 micrometers) and LWIR light (e.g., light having a wavelength of 8.0 to 12.0 micrometers) emitted from an area (e.g., an area in which a flame is or may be present). The MWIR light (e.g., MWIR radiation) can include light emitted by a flame in the area, and the LWIR light (e.g., LWIR radiation) can include light emitted by one or more objects in the area in addition to the flame (e.g., objects in the area that are at ambient temperature, background objects in the area, and/or people in the area).

The light emitted by the flame can have a wavelength of 2.7 micrometers or 4.2 to 4.4 micrometers, for example. That is, the flame can be, for example, a hydrogen flame whose major emission is from $H_2O$, or a hydrocarbon flame whose major emission is from $CO_2$. However, embodiments are not limited to a particular type of flame or light wavelength emitted by the flame.

The temperature of the flame can be, for example, 150 degrees Celsius or 400 degrees Celsius. That is, the flame can be emitted from, for example, a lighter or a torch. However, embodiments are not limited to a particular flame source or temperature.

Bolometer 104 can detect (e.g., determine the presence of) a flame in the area based on the MWIR light and LWIR light processed by optical element 102. For example, in embodiments in which optical element 102 does not include optical filter 108 (e.g., optical element 102 includes only lens 106), array 110 of pixels can absorb a portion of the MWIR light processed by optical element 102 and a portion of the LWIR light processed by optical element 102. The portion of the MWIR light absorbed by array 110 can be greater than the portion of the LWIR light absorbed by array 110 (e.g., array 110 can be more sensitive to MWIR light than LWIR light). For instance, array 110 can absorb 100% (e.g., all) of the MWIR light processed by optical element 102, but only 50-60%, 5-20%, or 5-10% of the LWIR processed by optical element 102. Embodiments of the present disclosure, however, are not limited to particular portions of MWIR or LWIR light absorbed by array 110.

Bolometer 104 can then generate an image (e.g., a single image) combining the portion of the MWIR light absorbed by array 110 and the portion of the LWIR light absorbed by array 110. That is, the image combines the light emitted by the flame with the light emitted by the objects in the area in addition to the flame. Accordingly, the image can display both the flame and the overall scene in which the flame is burning (e.g., the MWIR light emitted by the flame can be seen against and/or discriminated from the lower intensity LWIR spatial background).

In embodiments in which bolometer 104 includes multiple arrays of pixels, a first array (or a first number of the arrays) can absorb the MWIR light processed by optical element 102, and a second array (or a second number of the arrays) can absorb the LWIR light processed by optical element 102. Bolometer 104 can then generate an image combining the MWIR light absorbed by the first array (or the first number of arrays) and the LWIR light absorbed by the second array (or the second number of arrays).

As an additional example, in embodiments in which optical element 102 includes optical filter 108, the optical filter can alternatively prevent (e.g., block) the MWIR light and the LWIR light from reaching bolometer 104. That is, optical filter 108 can alternatively act as an MWIR filter that blocks MWIR light and an LWIR filter than blocks LWIR light. In some embodiments, optical filter 108 can comprise a single filter (e.g., a single combined MWIR and LWIR filter), and in some embodiments, optical filter 108 can comprise two filters (e.g., separate MWIR and LWIR filters).

In such an example, bolometer 104 can generate separate images of the MWIR light and the LWIR light. For instance, bolometer 104 can generate a first image of the MWIR light when optical filter 108 is blocking the LWIR light, and bolometer 104 can generate a second image of the LWIR light when optical filter 108 is blocking the MWIR light. That is, the light emitted by the flame and the light emitted by the additional objects in the area can be displayed at full intensity in separate images (e.g., the scene can be decoupled to provide the MWIR flame image separately from the LWIR scene image).

In embodiments in which optical element 102 includes a shutter in place of optical filter 108, the shutter can alternatively prevent the MWIR light and the LWIR light from reaching bolometer 104 in a manner analogous to optical filter 108. Bolometer 104 can then generate separate images of the MWIR light and the LWIR light (e.g., a first image of the MWIR light when the shutter is blocking the LWIR light and a second image of the LWIR light when the shutter is blocking the MWIR light).

Figure 2:
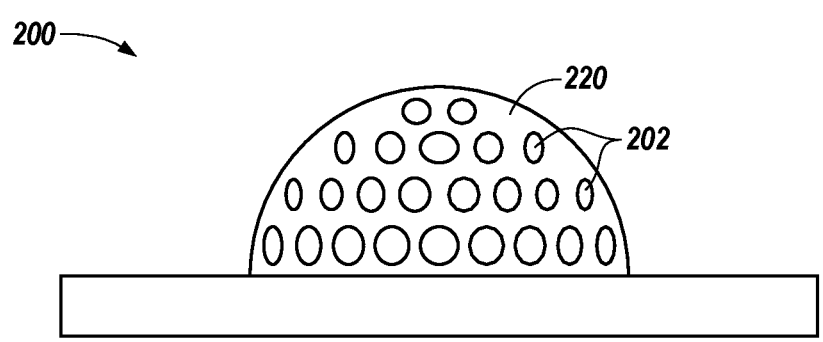
FIG. 2 illustrates a side view of a flame detector in accordance with one or more embodiments of the present disclosure.

FIG. 2 illustrates a side view of a flame detector 200 in accordance with one or more embodiments of the present disclosure. Flame detector 200 can be, for example, flame detector 100 previously described in connection with FIG. 1.

As shown in FIG. 2, flame detector 200 includes a number (e.g., plurality) of optical elements 202. The number of optical elements can be, for example, twelve. However, embodiments of the present disclosure are not limited to a particular number of optical elements.

Optical elements 202 can be analogous to optical element 102 previously described in connection with FIG. 1. For example, optical elements 202 can include a lens, an optical filter, and/or a shutter, and can process MWIR light and LWIR light, in a manner analogous to optical element 102.

As shown in FIG. 2, optical elements 202 (e.g., the lenses of optical elements 202) can be positioned on a hemispherical surface 220 of flame detector 200. Hemispherical surface 220 can have a diameter of, for example, 32 millimeters. However, embodiments of the present disclosure are not limited to a particular diameter for hemispherical surface 220.

Positioning optical elements 202 on a hemispherical surface (e.g., hemispherical surface 220) as in the embodiment illustrated in FIG. 2 can increase (e.g., widen) the field of view of flame detector 200. For example, flame detector 200 can have a field of view of 120×60, with a 320×240 25 micrometer pitch array. However, embodiments of the present disclosure are not limited to a particular field of view or pitch array for flame detector 200.

Although not shown in FIG. 2 for clarity and so as not to obscure embodiments of the present disclosure, flame detector 200 can include a bolometer (e.g., a single bolometer) analogous to bolometer 104 previously described in connection with FIG. 1. For example, the bolometer can detect a flame based on the MWIR light and LWIR light processed by optical elements 202, in a manner analogous to bolometer 104.

Figure 3:
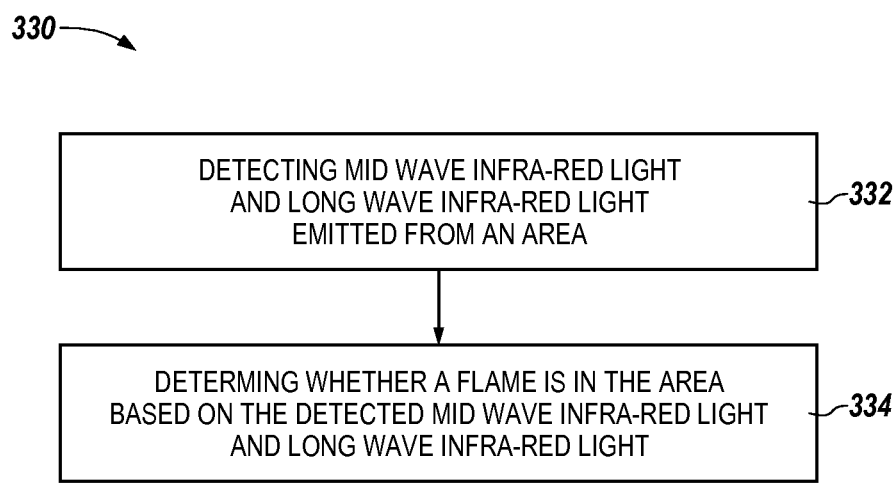
FIG. 3 illustrates a method of detecting a flame in accordance with one or more embodiments of the present disclosure.

FIG. 3 illustrates a method 330 of detecting a flame in accordance with one or more embodiments of the present disclosure. Method 330 can be performed by, for example, flame detectors 100 and/or 200 previously described in connection with FIGS. 1 and/or 2, respectively.

At block 332, method 330 includes detecting mid wave infra-red (MWIR) light and long wave infra-red (LWIR) light emitted from an area (e.g., an area in which a flame may be or is present). The MWIR and LWIR light can be detected, for example, using (e.g., by) an optical element (e.g., optical element 102 and/or 202) in a manner analogous to that previously described herein in connection with FIGS. 1 and/or 2.

At block 334, method 330 includes determining whether a flame is in the area based on the detected MWIR light and LWIR light. The determination can be made, for example, using a bolometer (e.g., bolometer 104) in a manner analogous to that previously described herein in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A flame detector, comprising:
   a plurality of optical elements configured to simultaneously process mid wave infra-red light and long wave infra-red light emitted from an area; and
   a bolometer configured to detect a flame in the area based on the mid wave infra-red light and long wave infra-red light simultaneously processed by the optical elements.

2. The flame detector of claim 1, wherein the bolometer includes an array of pixels configured to absorb a portion of the mid wave infra-red light simultaneously processed by the optical elements and a portion of the long wave infra-red light simultaneously processed by the optical elements.

3. The flame detector of claim 2, wherein the portion of the mid wave infra-red light is greater than the portion of the long wave infra-red light.

4. The flame detector of claim 1, wherein the optical elements include an optical filter configured to alternatively prevent the mid wave infra-red light and the long wave infra-red light from reaching the bolometer.

5. The flame detector of claim 4, wherein the optical filter is a fixed optical filter.

6. The flame detector of claim 4, wherein the optical filter is a movable optical filter.

7. The flame detector of claim 1, wherein the optical elements include a shutter configured to alternatively prevent the mid wave infra-red light and the long wave infra-red light from reaching the bolometer.

8. The flame detector of claim 1, wherein the optical elements include a dual mid wave infra-red and long wave infra-red lens.

9. A method of detecting a flame, comprising:
   simultaneously detecting, by a plurality of optical elements, mid wave infra-red light and long wave infra-red light emitted from an area; and
   determining whether a flame is in the area based on the simultaneously detected mid wave infra-red light and long wave infra-red light.

10. The method of claim 9, wherein:
    the mid wave infra-red light includes light emitted by the flame; and the long wave infra-red light includes light emitted by one or more objects in the area in addition to the flame.

11. The method of claim 10, wherein the light emitted by the flame has a wavelength of 2.7 micrometers or 4.2 to 4.4 micrometers.

12. The method of claim 9, wherein the method includes determining whether a flame is in the area by:
generating a first image of the detected mid wave infra-red light; and
generating a second image of the detected long wave infra-red light.

13. The method of claim 9, wherein the method includes determining whether a flame is in the area by generating a single image combining the detected mid wave infra-red light and long wave infra-red light.

14. The method of claim 9, wherein:
the mid wave infra-red light has a wavelength of 3.0 to 5.0 micrometers; and
the long wave infra-red light has a wavelength of 8.0 to 12.0 micrometers.

15. A flame detector, comprising:
a plurality of optical elements configured to simultaneously process mid wave infra-red light and long wave infra-red light emitted from an area, wherein each of the optical elements includes a lens and an optical filter; and
a bolometer configured to detect a flame in the area based on the mid wave infra-red light and long wave infra-red light simultaneously processed by the optical elements.

16. The flame detector of claim 15, wherein the bolometer includes:
a first array of pixels configured to absorb the mid wave infra-red light simultaneously processed by the optical elements; and
a second array of pixels configured to absorb the long wave infra-red light simultaneously processed by the optical elements.

17. The flame detector of claim 15, wherein each optical element includes:
a wide band reflector adjacent a first side of the optical filter; and
a wide band transmitter adjacent a second side of the optical filter.

18. The flame detector of claim 15, wherein the optical filter and lens of each optical element are separate.

19. The flame detector of claim 15, wherein the optical filter of each optical element is attached to the lens of the optical element.

20. The flame detector of claim 15, wherein the optical elements are positioned on a hemispherical surface of the flame detector.

* * * * *